(12) United States Patent
Kao et al.

(10) Patent No.: US 11,662,080 B2
(45) Date of Patent: May 30, 2023

(54) WAVELENGTH CONVERSION ELEMENT AND PROJECTION DEVICE

(71) Applicant: Coretronic Corporation, Hsin-Chu (TW)

(72) Inventors: Wei-Hua Kao, Hsin-Chu (TW); Fa-Chih Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/839,506

(22) Filed: Jun. 14, 2022

(65) Prior Publication Data

US 2022/0412536 A1 Dec. 29, 2022

(30) Foreign Application Priority Data

Jun. 24, 2021 (CN) .......................... 202121412237.2

(51) Int. Cl.
*G03B 21/20* (2006.01)
*F21V 9/32* (2018.01)
*F21K 9/64* (2016.01)

(52) U.S. Cl.
CPC ................. *F21V 9/32* (2018.02); *F21K 9/64* (2016.08); *G03B 21/204* (2013.01)

(58) Field of Classification Search
CPC ............................... G02B 7/006; G02B 7/008
See application file for complete search history.

(56) References Cited

U.S. PATENT DOCUMENTS

| | | | | |
|---|---|---|---|---|
| 6,914,734 B1* | 7/2005 | Kao | ..................... | G02B 26/008 356/418 |
| 7,940,484 B2* | 5/2011 | Ho | ........................ | G02B 5/003 359/885 |
| 10,613,317 B2* | 4/2020 | Fujii | ..................... | G03B 21/204 |
| 11,402,625 B2* | 8/2022 | Ni | ...................... | G03B 21/2066 |
| 2007/0053089 A1* | 3/2007 | Yu | ........................ | G02B 26/008 359/892 |
| 2008/0100940 A1* | 5/2008 | Tsai | ..................... | G02B 26/008 359/889 |
| 2008/0192372 A1* | 8/2008 | Lin | ...................... | G02B 26/008 359/891 |
| 2009/0027793 A1* | 1/2009 | Ho | ........................ | G02B 26/008 359/891 |
| 2009/0073591 A1* | 3/2009 | Chou | ................... | G02B 26/008 359/896 |

(Continued)

FOREIGN PATENT DOCUMENTS

TW 201715288 A 5/2017

*Primary Examiner* — Andrew J Coughlin

(57) ABSTRACT

A wavelength conversion element includes a wavelength conversion plate, a fixing ring and an adhesive layer. The wavelength conversion plate has a supporting surface. The fixing ring is disposed on the supporting surface. The adhesive layer is configured to adhere the fixing ring to the wavelength conversion plate. The adhesive layer includes a first adhesive portion and a second adhesive portion, and a density of the first adhesive portion is greater than a density of the second adhesive portion. A projection device including the aforementioned wavelength conversion element is also provided. The wavelength conversion element and the projection device provided by the invention have the advantages of short manufacturing process time and low cost.

12 Claims, 8 Drawing Sheets

(56) References Cited

U.S. PATENT DOCUMENTS

| | | | |
|---|---|---|---|
| 2009/0122273 A1* | 5/2009 | Menard | G02B 26/008 |
| | | | 353/84 |
| 2017/0127026 A1* | 5/2017 | Hsu | G03B 21/204 |
| 2018/0059403 A1* | 3/2018 | Takamatsu | G02B 26/008 |
| 2019/0068936 A1* | 2/2019 | Takagi | G02B 27/141 |
| 2019/0353994 A1* | 11/2019 | Hsu | G03B 21/16 |
| 2021/0376198 A1* | 12/2021 | Tsai | H01L 33/502 |

* cited by examiner

WAVELENGTH CONVERSION ELEMENT AND PROJECTION DEVICE

CROSS-REFERENCE TO RELATED APPLICATION

This application claims the priority benefit of China application serial no. 202121412237.2, filed on Jun. 24, 2021. The entirety of the above-mentioned patent application is hereby incorporated by reference herein and made a part of this specification.

FIELD OF THE INVENTION

The invention relates to a wavelength conversion element, and more particularly to a wavelength conversion element used in a projection device, and a projection device including the wavelength conversion element.

BACKGROUND OF THE INVENTION

The phosphor wheel of the existing projector rotates at a high rotational speed during operation. Obvious vibration and noise will occur if the phosphor wheel has slight unbalance. Therefore, the dynamic balance quality of the phosphor wheel is very important for the service life of the motor and the use experience of the projector.

The existing phosphor wheel usually includes a phosphor layer and a light-transmitting plate. The phosphor layer includes a variety of wavelength conversion materials to convert the excitation beam into color lights with different wavelengths. On the other hand, the light-transmitting plate can allow the excitation beam to pass therethrough, and the excitation beam that passes through the light-transmitting plate can form the beam required for the projection image together with the above-mentioned color lights. However, the density of each wavelength conversion material is different from each other, and the density of each wavelength conversion material is different from that of the light-transmitting plate. Thus, the existing phosphor wheel often has a large initial imbalance, and a large number of additional counterweight members are required to reduce the initial imbalance, which leads to a longer manufacturing process time and higher cost of the phosphor wheel.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength conversion element to reduce the usage of counterweight members.

The invention provides a projection device, which has the advantages of short manufacturing process time and low cost.

Other advantages and objects of the invention may be further illustrated by the technical features broadly embodied and described as follows.

In order to achieve one or a portion of or all of the objects or other objects, an embodiment of the invention provides a wavelength conversion element, which includes a wavelength conversion plate, a fixing ring and an adhesive layer. The wavelength conversion plate has a supporting surface. The fixing ring is disposed on the supporting surface. The adhesive layer is configured to adhere the fixing ring to the wavelength conversion plate. The adhesive layer includes a first adhesive portion and a second adhesive portion, and a density of the first adhesive portion is greater than a density of the second adhesive portion.

In order to achieve one or a portion of or all of the objects or other objects, an embodiment of the invention provides a projection device, which includes an illumination system, a light valve and a projection lens. The illumination system is configured to provide an illumination beam. The light valve is disposed on a transmission path of the illumination beam and configured to convert the illumination beam into an image beam. The projection lens is disposed on a transmission path of the image beam and configured to project the image beam. The illumination system includes an excitation light source and the aforementioned wavelength conversion element. The excitation light source is configured to provide an excitation beam. The characteristics of the wavelength conversion element have been described in the foregoing, and no redundant detail is to be given herein.

The wavelength conversion element of the invention adopts an adhesive layer with a first adhesive portion and a second adhesive portion, wherein the density of the first adhesive portion is greater than the density of the second adhesive portion. Therefore, the wavelength conversion element of the invention can effectively reduce the initial unbalance by using the adhesive layer, and thereby reducing the usage of the counterweight members, wherein the counterweight member is even not necessary to be provided in some embodiments. On the other hand, the projection device of the invention adopts the aforementioned wavelength conversion element and because the aforementioned wavelength conversion element can effectively reduce the usage of the counterweight members, the projection device of the invention has the advantages of short manufacturing process time and low cost.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
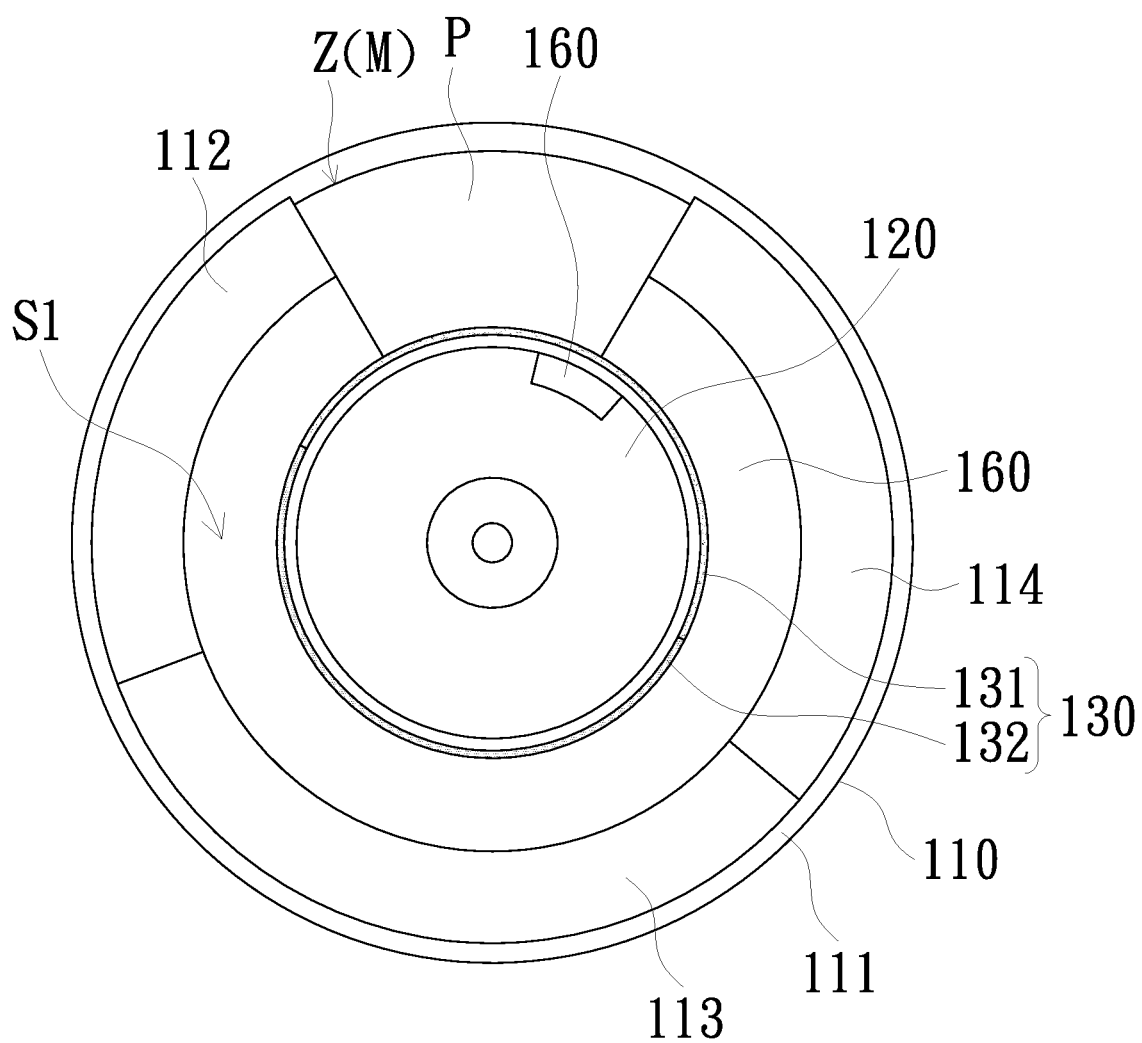
FIG. 1 is a schematic diagram of an assembly of a wavelength conversion element according to an embodiment of the invention.
Figure 2:
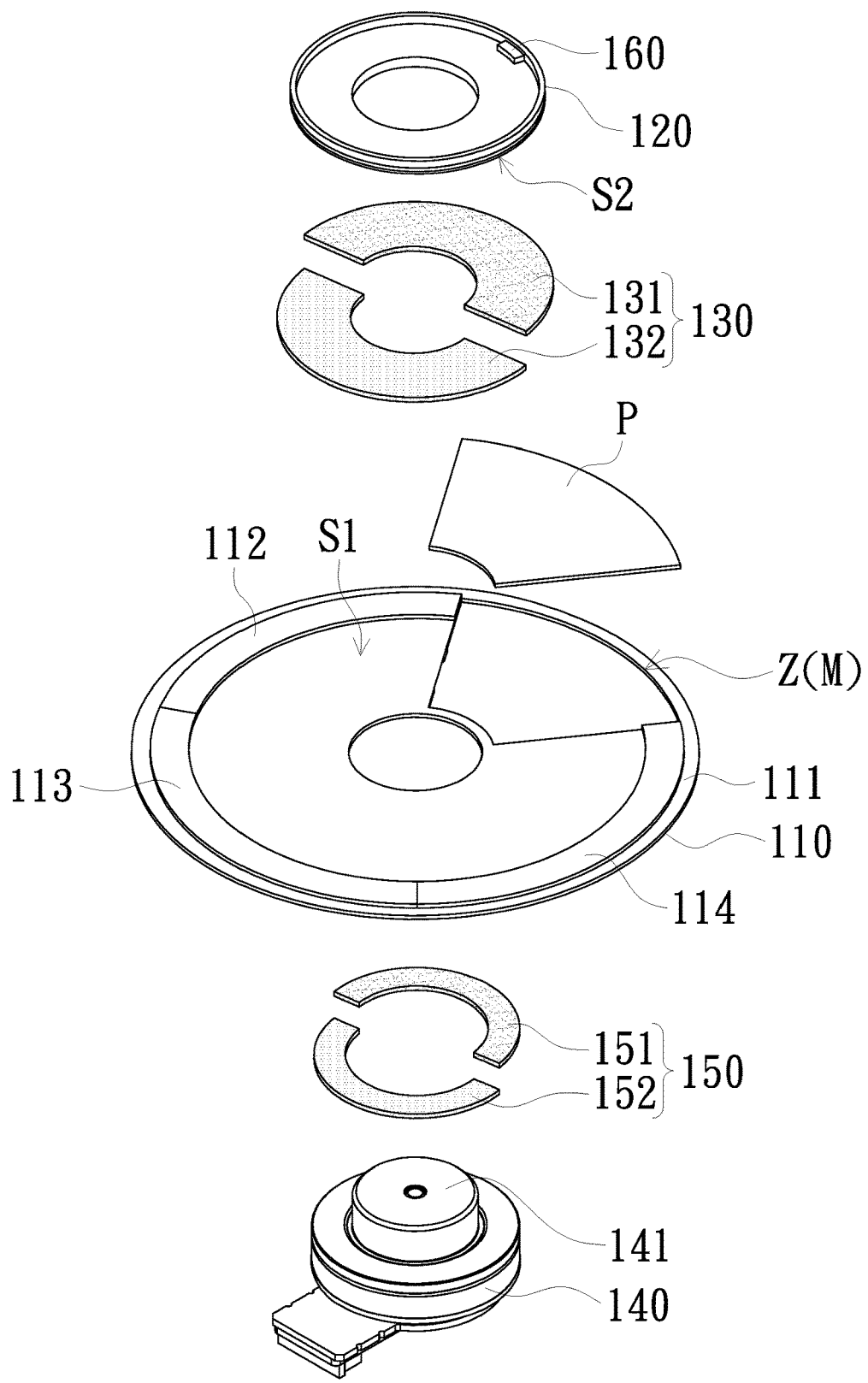
FIG. 2 is an exploded schematic diagram of the wavelength conversion element of FIG. 1.
Figure 3:
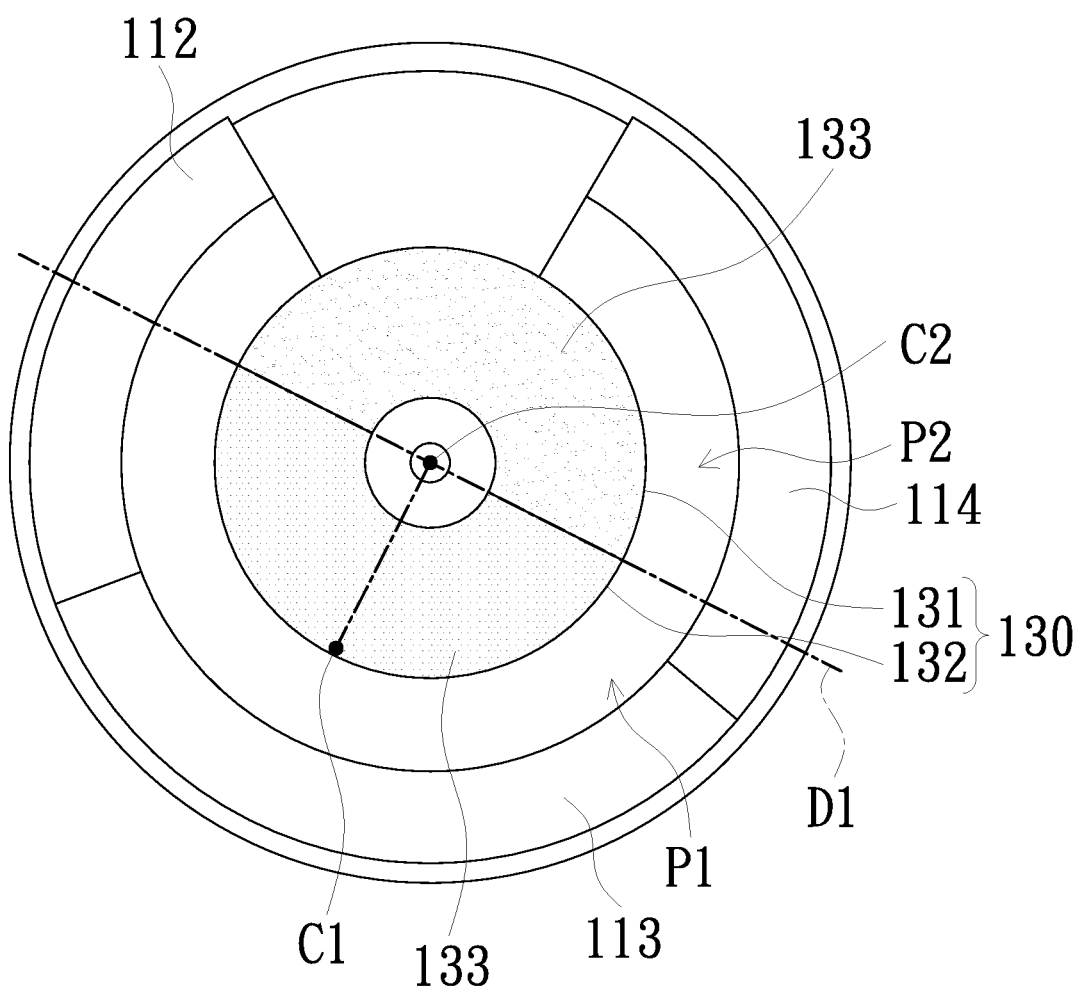
FIG. 3 is a schematic diagram of the position of the centroid of a wavelength conversion plate in FIG. 1.

FIG. 1 is a schematic diagram of an assembly of a wavelength conversion element according to an embodiment of the invention. FIG. 2 is an exploded schematic diagram of the wavelength conversion element of FIG. 1. FIG. 3 is a schematic diagram of the position of the centroid of a wavelength conversion plate in FIG. 1. Please refer to FIGS. 1, 2 and 3. The wavelength conversion element 100 includes a wavelength conversion plate 110, a fixing ring 120 and an adhesive layer 130. The wavelength conversion plate 110 has a supporting surface S1. The fixing ring 120 is disposed on the supporting surface S1. Specifically, the adhesive layer 130 adheres the fixing ring 120 to the supporting surface S1 of the wavelength conversion plate 110. The adhesive layer 130 includes a first adhesive portion 131 and a second adhesive portion 132, and the density of the first adhesive portion 131 is greater than the density of the second adhesive portion 132.

The fixing ring 120 is, for example, a metal fixing ring, but is not limited thereto. In addition, the wavelength conversion element 100 of this embodiment can be configured as a wavelength conversion wheel, so the wavelength conversion element 100 may further include a motor 140 (shown in FIG. 2). The motor 140 may include a rotating shaft 141. In detail, the fixing ring 120 can be sleeved on the rotating shaft 141 and is configured to clamp the wavelength conversion plate 110 with the motor 140, so that the wavelength conversion plate 110 can be rotated by the motor 140 stably. The fixing ring 120, the motor 140 and the wavelength conversion plate 110 can be fixed to each other in a pasting manner, and detailed features will be described in subsequent paragraphs.

The wavelength conversion plate 110 is, for example, a circular wavelength conversion plate, and may include a circular substrate 111 for rotation. The material of the circular substrate 111 in this embodiment may include metal or ceramic, wherein the aforementioned metal may include aluminum, copper, or silver, but is not limited thereto. In addition, the circular substrate 111 may further have a wavelength maintenance zone M. The wavelength maintenance zone M is, for example, an opening Z of the circular substrate 111 and is provided with a plate P. The shape of the plate P may correspond to the shape of the wavelength maintenance zone M, so that the plate P may be, for example, embedded in the wavelength maintenance zone M (i.e., the opening Z of the circular substrate 111). The plate P of this embodiment is, for example, a light-transmitting plate for allowing the beams to pass therethrough. A light-diffusing layer or a light-diffusing microstructure may be provided on the light-transmitting plate to eliminate the speckles formed by the beams. In addition, because the wavelength maintenance zone M itself is the opening Z, the wavelength maintenance zone M may allow the beam to direct pass therethrough without providing the plate P or other optical elements. The plate P in another embodiment may be a reflective plate to reflect the beam. The wavelength maintenance zone M in still another embodiment may be a part of the supporting surface S1 (e.g., the circular substrate 111 having no opening Z) to directly reflect the beams.

The wavelength conversion plate 110 of this embodiment may further include a plurality of wavelength conversion layers disposed on the circular substrate 111. Three wavelength conversion layers 112, 113 and 114 are taken as examples in the figure, but the invention is not limited thereto. The wavelength conversion layers 112, 113 and 114 can be configured to convert the wavelength of a beam (e.g., an excitation beam). For example, the wavelength conversion layers 112, 113 and 114 can respectively emit green light, red light and yellow light after being irradiated by a beam, but other embodiments are not limited thereto. For example, in one embodiment, the quantity of the aforementioned wavelength conversion layer may be one, and this wavelength conversion layer may emit yellow light after being irradiated by a beam. In another embodiment, the quantity of the aforementioned wavelength conversion layers may be two, and this two wavelength conversion layers may respectively emit green light and yellow light after being irradiated by a beam. It can be understood that the quantity of the aforementioned wavelength conversion layers can also be more than three, and the invention does not limit the specific quantity of the wavelength conversion layers. The wavelength conversion layers 112, 113 and 114 of this embodiment may include wavelength conversion materials for converting the wavelength of beams. The aforementioned wavelength conversion materials may include, for example, fluorescent materials, phosphorescent materials (e.g., phosphors), or nanomaterials (e.g., quantum dots), but are not limited thereto. In this embodiment, the density of the wavelength conversion layer 112 is, for example, greater than the density of the wavelength conversion layers 113 and 114, the density of the wavelength conversion layer 113 is, for example, approximately equal the density of the wavelength conversion layer 114, and the density of the wavelength maintenance zone M is, for example, smaller than the density of the wavelength conversion layers 112, 113 and 114. Therefore, the aforementioned density difference causes the centroid C1 of the wavelength conversion plate 110 to deviate from the circle center C2 of the wavelength conversion plate 110 as shown in FIG. 3 (e.g., the circle center C2 is located on a rotational axis of the wavelength conversion plate 110), so that the wavelength conversion plate 110 has an initial imbalance.

Please refer to FIGS. 2 and 3. This embodiment reduces the aforementioned initial imbalance by configuring the first adhesive portion 131 and the second adhesive portion 132 to have different densities (e.g., weight density). The first adhesive portion 131 and the second adhesive portion 132 may include mixed glue or non-mixed glue. The aforementioned mixed glue can be a mixture of materials selected from organic glue, inorganic glue and thermally conductive glue. The aforementioned non-mixed glue can be selected from organic glue, inorganic glue or thermally conductive glue. The organic glue can include silicone and epoxy, and the inorganic glue can include glass cement, but are not limited thereto. The first adhesive portion 131 and the second adhesive portion 132 in this embodiment may have the same mixed glue, and the first adhesive portion 131 and the second adhesive portion 132 may be further include a counterweight material 133 (labeled in FIG. 3). The counterweight material 133 (e.g., particles) is, for example, evenly distributed in the mixed glue (i.e., a part of the counterweight material 133 is evenly distributed in the mixed glue of the first adhesive portion 131 and the other part of the counterweight material 133 is evenly distributed in the mixed glue of the second adhesive portion 132), and the volume ratio of the counterweight material 133 to the first adhesive portion 131 is greater than the volume ratio of the counterweight material 133 to the second adhesive portion 132, so that the density (weight density) of the first adhesive portion 131 is greater than the density of the second adhesive portion 132 (e.g., the density of the counterweight material 133 is greater than the density of the mixed glue). The counterweight material 133 of this embodiment may include graphite, quartz, glass, ceramic or metal, but is not limited thereto. It should be understood that the first adhesive portion 131 and the second adhesive portion 132 in other embodiments may not include the counterweight material 133, but adopting mixed glues of different proportions or non-mixed glues of different densities to adjust the density of the first adhesive portion 131 and the density of the second adhesive portion 132.

The first adhesive portion 131 and the second adhesive portion 132 of this embodiment may be connected between the supporting surface S1 of the wavelength conversion plate 110 and a bottom surface S2 (labeled in FIG. 2, a surface close to the wavelength conversion plate 110) of the fixing ring 120. In detail, please refer to FIG. 3. The centroid C1 of the wavelength conversion plate 110 is deviated from the circle center C2 of the wavelength conversion plate 110. Taking a straight line D1 passing through the circle center C2 and perpendicular to the line connecting the centroid C1 and the circle center C2 as the boundary (define a first side P1 and a second side P2), the centroid C1 and the second adhesive portion 132 are located on the first side P1 of the straight line D1, and the first adhesive portion 131 is located on the second side P2 of the straight line D1. In this way, the arrangement range of the first adhesive portion 131 can be quickly and preliminarily defined, thereby reducing the initial imbalance of the wavelength conversion element 100. In this embodiment, it should be understood that the area of the arrangement range where the first adhesive portion 131 is provided on the supporting surface S1 of the wavelength conversion plate 110 is equal to the area of the arrangement range where the second adhesive portion 132 is provided on the supporting surface S1 of the wavelength conversion plate 110 (the thicknesses of the adhesive portions can also be set to be equal). In this way, the arrangement of the first adhesive portion 131 and the second adhesive portion 132 can be simplified, and the initial imbalance of the wavelength conversion element 100 can be reduced only by adjusting the density of the first adhesive portion 131 and the second adhesive portion 132.

Figure 4:
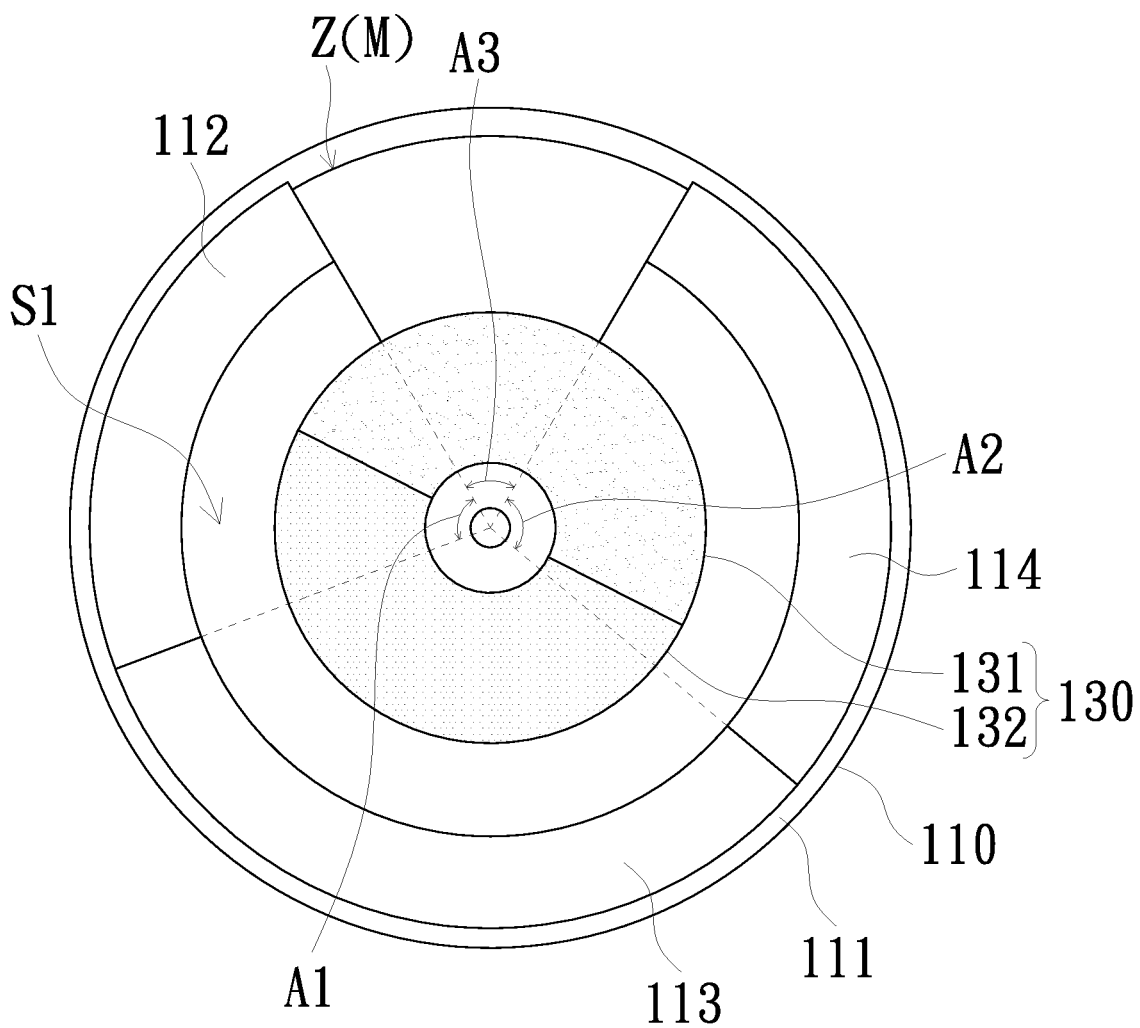
FIG. 4 is a schematic diagram of the wavelength conversion plate and the adhesive layer in FIG. 1.

FIG. 4 is a schematic diagram of the wavelength conversion plate and the adhesive layer in FIG. 1. Please refer to FIG. 4. The wavelength conversion layer 112 with the largest density is, for example, evenly distributed within the first central angle A1 of the circular substrate 111 (e.g., a shape of the arrangement area of the wavelength conversion layer 112 is an annulus sector), and the wavelength conversion layer 114 with the smallest density is, for example, evenly distributed within the second central angle A2 of the circular substrate 111 (e.g., a shape of the arrangement area of the wavelength conversion layer 114 is an annulus sector). The first adhesive portion 131 and the second adhesive portion 132 are, for example, arranged in the following manner: within the first central angle A1, the central angle range occupied by the second adhesive portion 132 is greater than the central angle range occupied by the first adhesive portion 131; and within the second central angle A2, the central angle range occupied by the first adhesive portion 131 is greater than the central angle range occupied by the second adhesive portion 132. It should be noted that the specific proportions of the first adhesive portion 131 and the second adhesive portion 132 in the first central angle A1 and the second central angle A2 may vary with the position of the centroid C1 (shown in FIG. 3) of the wavelength conversion plate 110, and are not limited to the figure. For example, in one embodiment, the second adhesive portion 132 may occupy all the first central angle A1, and the first adhesive portion 131 may occupy all the second central angle A2.

Similarly, the wavelength maintenance zone M of this embodiment is, for example, distributed within the third central angle A3 of the circular substrate 111. Because the density of the wavelength maintenance zone M is less than the density of the wavelength conversion layers 112, 113 and 114, the central angle range occupied by the first adhesive portion 131 is greater than the central angle range occupied by the second adhesive portion 132 within the third central angle A3. For example, the first adhesive portion 131 of this embodiment occupies all the third central angle A3, but the invention is not limited thereto.

Please refer to FIG. 2 again. The wavelength conversion element 100 may further include a motor adhesive layer 150. The motor adhesive layer 150 is connected between the motor 140 and the wavelength conversion plate 110. The motor adhesive layer 150 includes adhesive portions 151 and 152. The density of the adhesive portion 151 is different to the density of the adhesive portion 152, thereby further reducing the initial imbalance of the wavelength conversion element 100. Specifically, the density of the adhesive portion 151 may be greater than the density of the adhesive portion 152. The characteristics of the adhesive portion 151 may be similar to those of the first adhesive portion 131, and the characteristics of the adhesive portion 152 may be similar to those of the second adhesive portion 132, so no redundant detail is to be given herein. It should be noted that because the arrangement area of the motor adhesive layer 150 is generally smaller than the arrangement area of the adhesive layer 130, the effect of the adhesive layer 130 in reducing the initial imbalance is more significant than that of the motor adhesive layer 150. Therefore, the adhesive layer 130 can be provided first and then the motor adhesive layer 150 is provided during the manufacturing process, but the invention is not limited thereto. Incidentally, the thickness of the motor adhesive layer 150 and the thickness of the adhesive layer 130 in the direction perpendicular to the supporting surface 51 may be between 0.01 and 2 mm, but are not limited thereto. In addition, the thickness of the motor adhesive layer 150 and the thickness of the adhesive layer 130 may be the same or different from each other.

Please refer to FIGS. 1 and 2 again. The wavelength conversion element 100 may further include a counterweight member 160. The counterweight member 160 is disposed on the fixing ring 120 to further reduce the initial unbalance of the wavelength conversion element 100. However, the wavelength conversion element 100 in other embodiments may not be provided with the counterweight member 160, and the invention is not limited thereto.

Compared with the prior art, the wavelength conversion element 100 of this embodiment adopts the first adhesive portion 131 and the second adhesive portion 132 with different densities. Therefore, the wavelength conversion element 100 of this embodiment can effectively reduce the initial unbalance by using the adhesive layer 130, and thereby reducing the usage of the counterweight member 160, wherein the counterweight member 160 is even not necessary to be provided in some embodiments. Furthermore, the counterweight material 133 can be distributed in the adhesive layer 130, which can further achieve the weight balance of the various zones of the wavelength conversion element 100. Incidentally, although this embodiment takes two adhesive portions (the first adhesive portion 131 and second adhesive portion 132) with different densities as an example, the specific quantity of the adhesive portions is not limited thereto.

Figure 5:
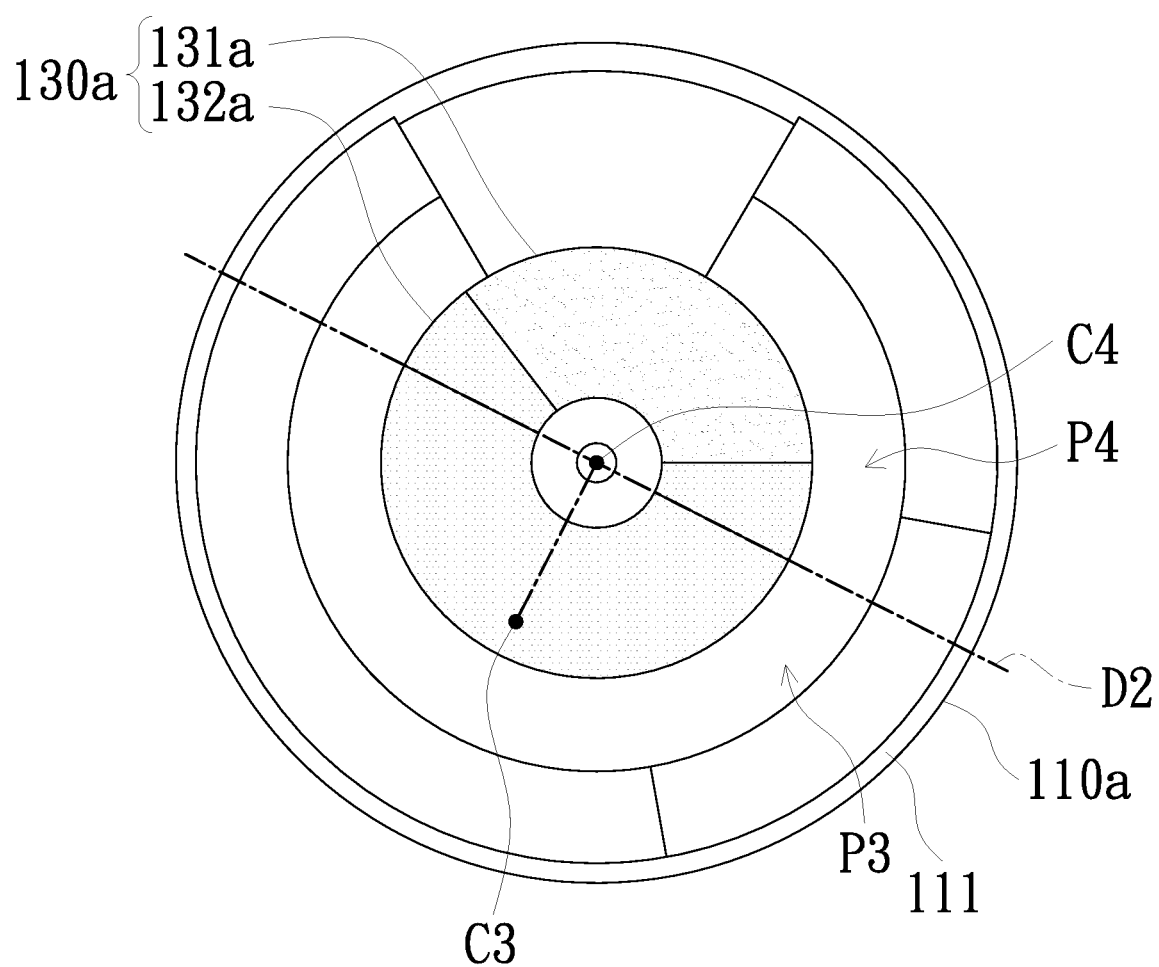
FIG. 5 is a schematic diagram of a wavelength conversion plate and an adhesive layer of a wavelength conversion element according to another embodiment of the invention.

It should be understood that the position of the centroid C1 in FIG. 3 varies with the structure of the wavelength conversion plate 110, so the arrangement range of the first adhesive portion 131 and the second adhesive portion 132 can also be adjusted accordingly. Specifically, the first adhesive portion 131 preferably does not extend to the first side P1, but the second adhesive portion 132 may extend to the second side P2 as appropriate. For example, FIG. 5 is a schematic diagram of a wavelength conversion plate and an adhesive layer of a wavelength conversion element according to another embodiment of the invention. As shown in the wavelength conversion element 100*a* of FIG. 5, because the position of the centroid C3 of the wavelength conversion plate 110*a* is slightly different from that in FIG. 3, a part of the second adhesive portion 132*a* can be disposed on the second side P4 to adjust the initial imbalance. In this embodiment, a part of the second adhesive portion 132*a* which is provided on the first side P3 and a part of the second adhesive portion 132*a* which is provided on the second side P4 may be connected to each other, and the area ratio of the first adhesive portion 131*a* to the second side P4 is less than that in the embodiment of FIG. 3 (e.g., half annulus sector).

Figure 6:
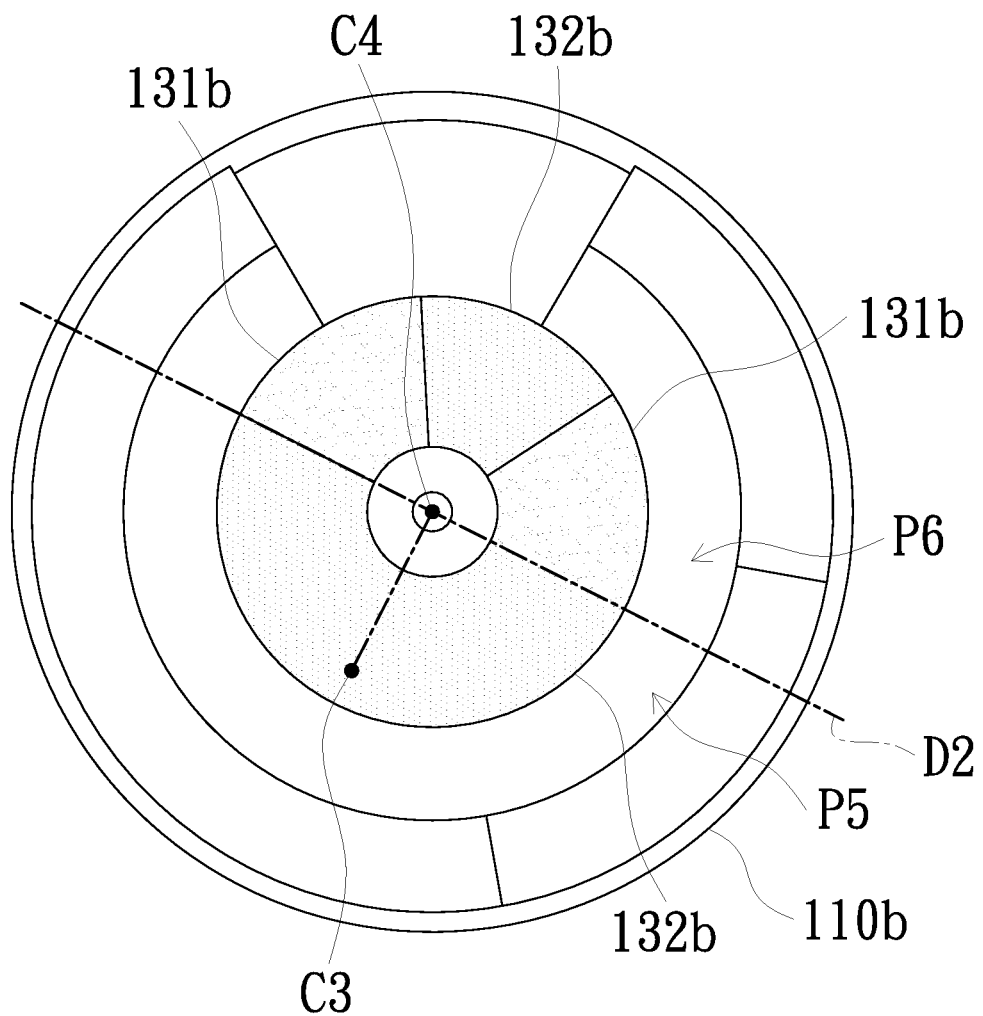
FIG. 6 is a schematic diagram of a wavelength conversion plate and an adhesive layer of a wavelength conversion element according to still another embodiment of the invention.

FIG. 6 is a schematic diagram of a wavelength conversion plate and an adhesive layer of a wavelength conversion element according to still another embodiment of the invention. As shown in the wavelength conversion element 100*b* of FIG. 6, a part of the second adhesive portion 132*b* which is provided on the second side P6 and a part of the second adhesive portion 132*b* which is provided on the first side P5 can be separated from each other. Specifically, the first adhesive portion 131*b* may include two parts, and the part of the second adhesive portion 132*b* provided on the second side P6 is located between the two parts of the first adhesive portion 131*b*, so that a centroid of the wavelength conversion element 100 is adjusted to a position close to the circle center C4. As such, the adhesive portions can be dispersed, and the weight balance of the wavelength conversion element 100 is further achieved. Specifically, in the invention, the adhesive layers on the left and right sides of the line connecting the centroid and the circle center of the wavelength conversion plate are, for example, symmetrical (or having mirror images), which can simplify the design of the area where the adhesive layer is disposed, but the invention is not limited thereto. It should be noted that the method of preliminarily defining the arrangement range of the first adhesive portions 131, 131*a* and 131*b* shown in FIGS. 3, 5 and 6 is also applicable to the wavelength conversion plate including one, two, or more than three wavelength conversion layers. Therefore, the invention does not limit the specific quantity of the wavelength conversion layers.

Figure 7:
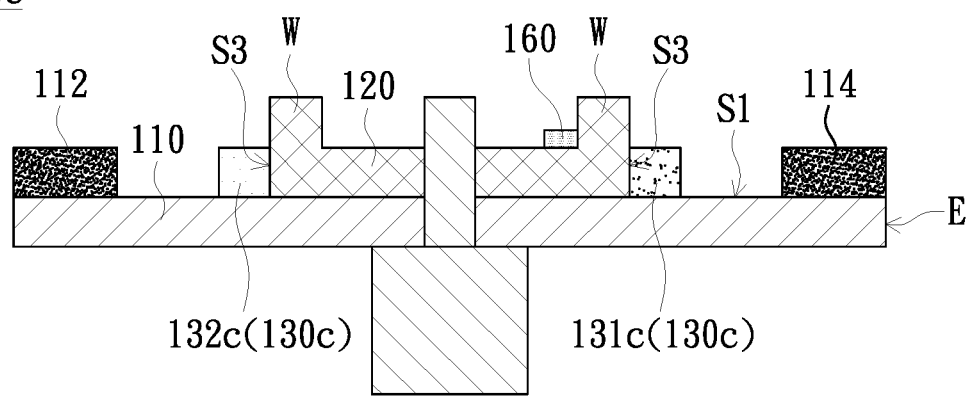
FIG. 7 is a schematic cross-sectional view of a wavelength conversion element according to yet another embodiment of the invention.

FIG. 7 is a schematic cross-sectional view of a wavelength conversion element according to yet another embodiment of the invention. The structure and advantages of the wavelength conversion element 100*c* of this embodiment are similar to those of the previous embodiments, and only the differences will be described below. Please refer to FIG. 7. The fixing ring 120 may have an outer ring surface S3, and the outer ring surface S3 faces the outer edge E of the wavelength conversion plate 110. The first adhesive portion 131*c* and the second adhesive portion 132*c* of the adhesive layer 130*c* are connected between the outer ring surface S3 and the supporting surface S1. For example, the first adhesive portion 131*c* and the second adhesive portion 132*c* of this embodiment are adhered to the outer ring surface S3 and the supporting surface S1. The first adhesive portion 131*c* and the second adhesive portion 132*c* in other embodiments may further extend to cover an outer ring wall W of the fixing ring 120 (e.g., extend to cover a top surface of the fixing ring 120).

Figure 8:
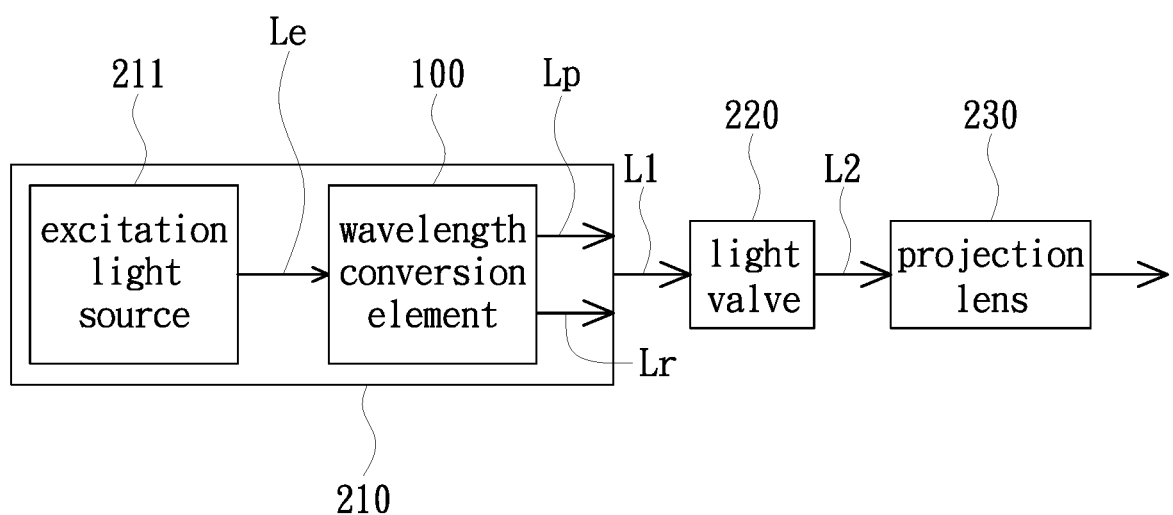
FIG. 8 is a block diagram of a projection device according to an embodiment of the invention.

FIG. 8 is a block diagram of a projection device according to an embodiment of the invention. Please refer to FIG. 8. The projection device 200 includes an illumination system 210, a light valve 220 and a projection lens 230. The illumination system 210 is configured to provide an illuminating beam L1. The light valve 220 is disposed on the transmission path of the illuminating beam L1 and configured to convert the illuminating beam L1 into an image beam L2. The projection lens 230 is disposed on the transmission path of the image beam L2 and configured to project the image beam L2.

The illumination system 210 includes an excitation light source 211 and a wavelength conversion element 100. The excitation light source 211 is configured to provide an excitation beam Le. In other embodiments, the wavelength conversion element 100 may be replaced with the wavelength conversion element 100a, 100b or 100c. The excitation light source 211 includes, for example, a light emitting diode (LED) or a laser diode (LD), wherein the quantity of the light emitting diode or laser diode may be one or more. For example, the light emitting diodes (or laser diodes) may be arranged in a matrix when the quantity of light emitting diodes (or laser diodes) is plural. The wavelength conversion element is disposed on the transmission path of the excitation beam Le (i.e., beam) to convert a part of the excitation beam Le into a converted beam Lp. In addition, the other part of the excitation beam Le is not converted into the converted beam Lp (indicated by a beam Lr in the figure) by the wavelength conversion element 100. The beam Lr and the converted beam Lp form the illuminating beam L1. The beam Lr and the converted beam Lp are, for example, transmitted to the light valve 220 in different time intervals. Because the features of the wavelength conversion element 100 have been described in detail in the foregoing, no redundant detail is to be given herein.

The light valve 220 is, for example, a digital micromirror device (DMD), a liquid crystal on silicon (LCoS) or a liquid crystal display (LCD), but is not limited thereto. In addition, this embodiment does not limit the quantity of light valves. For example, the projection device 200 of this embodiment may adopt a single-chip liquid crystal display panel or three-chip liquid crystal display panel structure, and the invention is not limited thereto.

The projection lens 230 includes, for example, one or more optical lenses, and the diopters of the optical lenses may be the same or different from each other. For example, the optical lens may include various non-planar lenses such as biconcave lenses, biconvex lenses, meniscus lenses, convex-concave lenses, plano-convex lenses, and plano-concave lenses, or any combination of the above-mentioned non-planar lenses. On the other hand, the projection lens 230 may also include a flat optical lens. The invention does not limit the specific structure of the projection lens 230.

Compared with the prior art, the projection device 200 of this embodiment adopts the wavelength conversion element 100. Because the wavelength conversion element 100 can effectively reduce the usage of the counterweight member 160, the projection device 200 of this embodiment has the advantages of shorter manufacturing time and low cost.

In summary, the wavelength conversion element of the invention adopts an adhesive layer with a first adhesive portion and a second adhesive portion, wherein the density of the first adhesive portion is greater than the density of the second adhesive portion. Therefore, the wavelength conversion element of the invention can effectively reduce the initial unbalance by using the adhesive layer, and thereby reducing the usage of the counterweight members, wherein the counterweight member is even not necessary to be provided in some embodiments. On the other hand, the projection device of the invention adopts the aforementioned wavelength conversion element and because the aforementioned wavelength conversion element can effectively reduce the usage of the counterweight members, the projection device of the invention has the advantages of short manufacturing process time and low cost.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first adhesive portion, the second adhesive portion, the first side, the second side, the first central angle and the second central angle are only used for distinguishing various elements and do not limit the number of the elements.

What is claimed is:

1. A wavelength conversion element, comprising a wavelength conversion plate, a fixing ring and an adhesive layer, wherein:
   the wavelength conversion plate has a supporting surface;
   the fixing ring is disposed on the supporting surface; and
   the adhesive layer is configured to adhere the fixing ring to the wavelength conversion plate, the adhesive layer comprises a first adhesive portion and a second adhesive portion, and a density of the first adhesive portion is greater than a density of the second adhesive portion,
   wherein the first adhesive portion and the second adhesive portion are connected between a bottom surface of the fixing ring and the supporting surface.

2. The wavelength conversion element according to claim 1, wherein the wavelength conversion plate is a circular wavelength conversion plate, a centroid of the wavelength conversion plate deviates from a circle center of the wavelength conversion plate, wherein taking a straight line passing through the circle center and perpendicular to a line connecting the centroid and the circle center as a boundary, the centroid and the second adhesive portion are located on a first side of the straight line, and the first adhesive portion is located on a second side of the straight line.

3. The wavelength conversion element according to claim 2, wherein the wavelength conversion plate comprises a circular substrate and a plurality of wavelength conversion layers disposed on the circular substrate, densities of the wavelength conversion layers are different from each other, the wavelength conversion layer with the largest density is distributed within a first central angle of the circular substrate, the wavelength conversion layer with the smallest density is distributed within a second central angle of the circular substrate, wherein within the first central angle, a central angle range occupied by the second adhesive portion is greater than a central angle range occupied by the first adhesive portion, wherein within the second central angle, a central angle range occupied by the first adhesive portion is greater than a central angle range occupied by the second adhesive portion.

4. The wavelength conversion element according to claim 3, wherein the circular substrate further comprises a wavelength maintaining zone, distributed within a third central angle of the circular substrate, wherein within the third central angle, a central angle range occupied by the first adhesive portion is greater than a central angle range occupied by the second adhesive portion.

5. The wavelength conversion element according to claim 1, wherein the wavelength conversion plate is a circular wavelength conversion plate, a centroid of the wavelength conversion plate deviates from a circle center of the wavelength conversion plate, wherein taking a straight line passing through the circle center and perpendicular to a line connecting the centroid and the circle center as a boundary, the centroid and a part of the second adhesive portion are located on a first side of the straight line, another part of the second adhesive portion is located on a second side of the straight line, and the first adhesive portion is located on the second side of the straight line.

6. The wavelength conversion element according to claim 5, wherein the part of the second adhesive portion disposed on the first side and the part of the second adhesive portion disposed on the second side are connected with each other.

7. The wavelength conversion element according to claim 5, wherein the part of the second adhesive portion disposed on the second side and the part of the second adhesive portion disposed on the first side are separated from each other, wherein the first adhesive portion comprises two parts, and the part of the second adhesive portion disposed on the second side is located between the two parts of the first adhesive portion.

8. The wavelength conversion element according to claim 1, wherein the first adhesive portion and the second adhesive portion comprise mixed glue or non-mixed glue.

9. The wavelength conversion element according to claim 1, wherein the first adhesive portion and the second adhesive portion are provided with a counterweight material, and a volume ratio of the counterweight material to the first adhesive portion is greater than a volume ratio of the counterweight material to the second adhesive portion.

10. The wavelength conversion element according to claim 1, further comprising a motor and a motor adhesive layer, wherein the motor adhesive layer is connected between the motor and the wavelength conversion plate, the motor adhesive layer comprises two adhesive portions, and the two adhesive portions have different densities.

11. A wavelength conversion element, comprising a wavelength conversion plate, a fixing ring and an adhesive layer, wherein:
the wavelength conversion plate has a supporting surface;
the fixing ring is disposed on the supporting surface; and
the adhesive layer is configured to adhere the fixing ring to the wavelength conversion plate, the adhesive layer comprises a first adhesive portion and a second adhesive portion, and a density of the first adhesive portion is greater than a density of the second adhesive portion,
wherein the fixing ring has an outer ring surface, the outer ring surface faces an outer edge of the wavelength conversion plate, and the first adhesive portion and the second adhesive portion are connected between the outer ring surface and the supporting surface.

12. A projection device, comprising an illumination system, a light valve and a projection lens, the illumination system being configured to provide an illumination beam, the light valve being disposed on a transmission path of the illumination beam and configured to convert the illumination beam into an image beam, the projection lens being disposed on a transmission path of the image beam and configured to project the image beam, and the illumination system comprising an excitation light source and a wavelength conversion element, wherein:
the excitation light source is configured to provide an excitation beam; and
the wavelength conversion element comprises a wavelength conversion plate, a fixing ring and an adhesive layer, wherein the wavelength conversion plate has a supporting surface, the fixing ring is disposed on the supporting surface, the adhesive layer is configured to adhere the fixing ring to the wavelength conversion plate, the adhesive layer comprises a first adhesive portion and a second adhesive portion, and a density of the first adhesive portion is greater than a density of the second adhesive portion,
wherein the first adhesive portion and the second adhesive portion are connected between a bottom surface of the fixing ring and the supporting surface.

\* \* \* \* \*